(12) United States Patent
Lee (10) Patent No.: US 9,791,627 B1
(45) Date of Patent: Oct. 17, 2017

(54) INTEGRATED OPTICAL COMPONENTS WITH WAVELENGTH TUNING AND POWER ISOLATION FUNCTIONS

(71) Applicant: DICON FIBEROPTICS, INC., Richmond, CA (US)

(72) Inventor: Ho-Shang Lee, El Sobrante, CA (US)

(73) Assignee: DICON FIBEROPTICS, INC., Richmond, CA (US)

( * ) Notice: Subject to any disclaimer, the term of this patent is extended or adjusted under 35 U.S.C. 154(b) by 0 days.

(21) Appl. No.: 15/154,643

(22) Filed: May 13, 2016

Related U.S. Application Data

(60) Provisional application No. 62/320,188, filed on Apr. 8, 2016.

(51) Int. Cl.
| | |
|---|---|
| G02B 6/27 | (2006.01) |
| G02B 5/30 | (2006.01) |
| G02B 6/293 | (2006.01) |
| G02B 6/35 | (2006.01) |

(52) U.S. Cl.
CPC ......... *G02B 6/2706* (2013.01); *G02B 5/3083* (2013.01); *G02B 6/2746* (2013.01); *G02B 6/2773* (2013.01); *G02B 6/29311* (2013.01); *G02B 6/29382* (2013.01); *G02B 6/3512* (2013.01)

(58) Field of Classification Search
None
See application file for complete search history.

(56) References Cited

U.S. PATENT DOCUMENTS

| | | |
|---|---|---|
| 4,548,478 A | 10/1985 | Shirasaki |
| 5,044,713 A | 9/1991 | Mozer et al. |
| 5,082,343 A | 1/1992 | Coult et al. |
| 5,566,259 A | 10/1996 | Pan et al. |
| 7,899,330 B2 | 3/2011 | Ye et al. |
| 8,199,265 B2 * | 6/2012 | Wada ................ G02B 27/0905 349/18 |

OTHER PUBLICATIONS

Birman et al., U.S. Appl. No. 15/139,694 entitled "Tunable Optical Filter With Adjustable Bandwith." filed Apr. 27, 2016.
Lee et al., U.S. Appl. No. 08/403,405 entitled "Fiberoptic Isolator With Low PDL and PMD." filed Mar. 14, 1995.

* cited by examiner

*Primary Examiner* — Uyen Chau N Le
*Assistant Examiner* — Chad Smith
(74) *Attorney, Agent, or Firm* — Vierra Magen Marcus LLP (57) ABSTRACT

A tunable optical filter integrates the functions of wavelength tuning and power isolation of back reflection. The optical signal enters a Faraday rotator twice, and isolation is provided by two birefringent crystals, having their optical axes oriented at 45 degrees with respect to each other. The two birefringent crystals are on the same side of the Faraday rotator. The integration of an optical tunable filter and an isolator function into a single packaged component helps to reduce the size and complexity of optical amplifier systems, such as EDFAs and PDFAs, operating in the 1550 nm and 1310 nm transmission bands, respectively.

21 Claims, 7 Drawing Sheets

INTEGRATED OPTICAL COMPONENTS WITH WAVELENGTH TUNING AND POWER ISOLATION FUNCTIONS

CROSS-REFERENCE TO RELATED APPLICATIONS

This application claims priority from, U.S. Provisional Application No. 62/320,188, filed on Apr. 8, 2016, which is hereby incorporated in its entirety by this reference.

BACKGROUND

The following relates generally to the optical components used in optical communication networks, and specifically to optical devices that can filter optical signals, while providing the functions of wavelength tuning, as well as power isolation of the optical signal.

Figure 1:
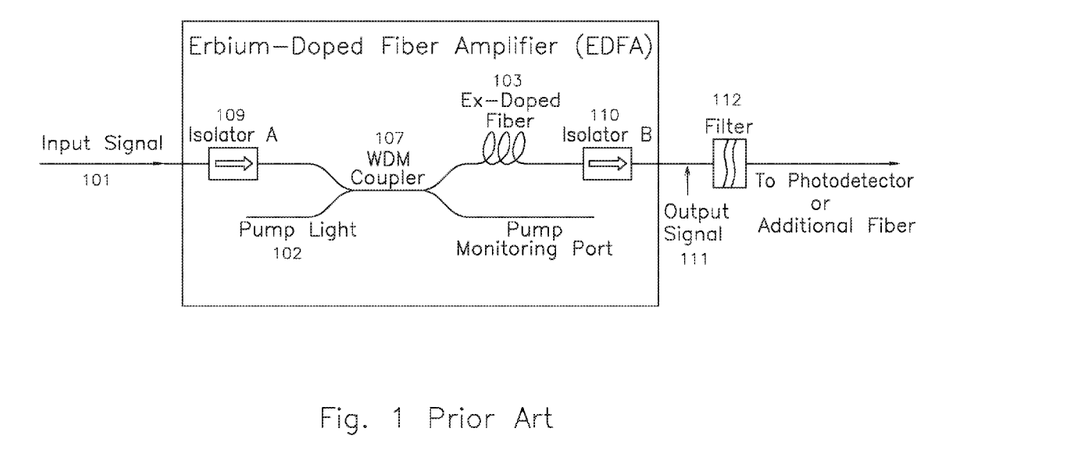
FIG. 1 illustrates an Erbium-Doped Fiber Amplifier (EDFA), used to amplify an optical signal.

Erbium-Doped Fiber Amplifiers (EDFAs) or Praseodymium-doped fiber Amplifiers (PDFAs) are widely deployed in optical networks, in the 1550 nm or 1310 nm wavelength windows, respectively. FIG. 1 illustrates the optical components that are typically included in a prior art EDFA. Note that PDFAs use a similar configuration. The optical power from the pump light source 102 boosts the Erbium ions embedded in the erbium-doped fiber 103 to a higher energy level. The optical input signal 101 then induces stimulated emission and is therefore amplified to create the output signal. However, amplified spontaneous emission (ASE) noise is also generated simultaneously, and creates noise on top of the input signal 101. Thus the output signal 111 consists of an amplified input signal, as well as the ASE noise component. Two isolators, 109 and 110, are located on the input side of a WDM coupler 107, and after the erbium-doped fiber 103, respectively. The second isolator B (110) is intended to prevent the back scattering power out of the downstream optical fiber and other components from re-entering the EDFA. This unwanted back scattering power would otherwise be amplified, and would therefore interfere with the EDFA's normal characteristics and performance. The first isolator A (109) is intended to block the ASE noise and back scattering that are generated inside the EDFA, from propagating upstream and interfering with the input signal 101.

An optical filter 112 is also used to filter out most of the unwanted ASE noise that exits the output signal port 111, so that only the intended optical signal wavelength or bandwidth is allowed to pass through the filter. In today's advanced, re-configurable optical networks, the signal wavelength can be dynamically changed to provide flexibility in the overall network configuration. Therefore, a tunable optical filter 112 is typically used, and must be tuned or adjusted so that its passband matches the wavelength change in input signal 101.

As has been occurring with cell phones, more and more components are being squeezed into individual optical modules, with the same limited volume, in order to save space, and also to upgrade the performance of network control centers. Fiber splicing between separate fiber optic components is cumbersome, and also occupies space. It is therefore desirable to integrate multiple optical components into a single package. In the case of EDFAs, as illustrated in FIG. 1, it is desirable for the optical tunable filter 112 to be physically integrated with isolator B (110).

SUMMARY

A tunable optical filter device includes a diffraction element, oriented to differentially diffract light of different wavelengths of a beam of light incident thereupon from an input port, and a reflector configured to reflect a portion of the beam of light incident on the reflector by the diffraction element to be diffracted a second time by the diffraction element in an optical path between the input port and an output port. A first birefringent element having a first optical axis in included in the optical path between the input port and the diffraction element, and a second birefringent element having a second optical axis is also included in the optical path between the diffraction element and the output port. The second optical axis is oriented substantially at a 45 degree angle with respect to the first optical axis along the optical path. The tunable optical filter device also includes one or more Faraday rotators located in the optical path between the first and second birefringent elements such that the optical path passes through the each of the Faraday rotators one or more times, where the Faraday rotators are configured to provide a combined rotation of polarization to a beam of light traversing the optical path between the first and second birefringent elements substantially equal to the difference in orientation between the optical axes of the first and second birefringent elements. An actuator is connected to change a position of the reflector so that a selected range of wavelengths of the portion of the beam of light incident upon the reflector is reflected along the optical path from the input port to the output port.

A method includes receiving a beam of light from an input port and refracting the beam of light a first time by a first birefringent element having a first optical axis. A diffraction element differentially diffracts light of different wavelengths of the beam of light from the input port that is incident upon it through the first birefringent element. A reflector is positioned so that a first selected range of wavelengths of a portion of the beam of light incident upon the reflector from the diffraction element is reflected along an optical path from the input port to an output port. The diffraction element diffracts a second time the portion of the beam of light incident upon the reflector along a portion the optical path between the reflector and the output port. The beam of light is refracted a second time along a portion the optical path between the diffraction element and the output port by a second birefringent element having a second optical axis, where the second optical axis is oriented substantially at a 45 degree angle with respect to the first optical axis along the optical path. The method also includes rotating one or more times a polarization of a beam of light traversing the optical path between the first and second birefringent elements, wherein the combined rotation from the one or more times is substantially equal to the difference in orientation between the optical axes of the first and second birefringent elements.

Various aspects, advantages, features and embodiments are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

Figure 2:
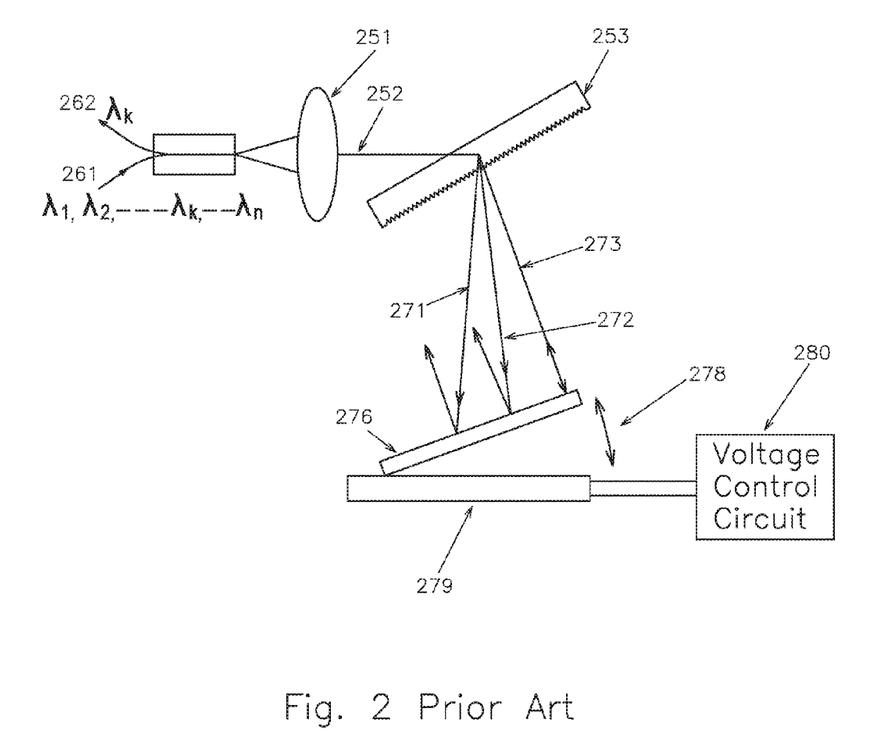
FIG. 2 shows a prior art embodiment of a tunable optical filter, using a diffraction grating and a rotating or tilting mirror.

FIG. 2 shows a prior art embodiment of a tunable optical filter (refer to U.S. Pat. No. 7,899,330 for more detail). The optical signal light in an input fiber 261 carrying multiple wavelengths is collimated by a lens 251 and then impinges on a diffraction grating 253. The optical signal is angularly dispersed into its multiple wavelengths, propagating at slightly different angles (denoted by three rays 271, 272 and 273, respectively). One of the rays 273, representing one of the wavelengths of the input optical signal, or a contiguous range of wavelengths, is reflected by a rotational mirror 276, passing back through the grating 253 and the lens 251 a second time, and is coupled to an output fiber 262. Thus, one or a few of the multiple wavelengths from the input fiber 261 are selected, and sent to the output fiber 262. The mirror 276 is rotated by the actuator to select the wavelength(s) that are being coupled to the output fiber 262, by adjusting a voltage from the voltage control circuit 280.

Figure 3A:
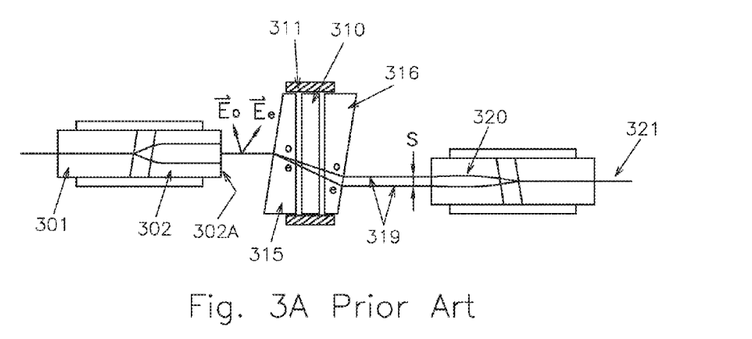
FIG. 3A shows a polarization-independent isolator component.

FIG. 3A shows a prior art embodiment of a polarization-independent isolator. A Faraday rotator 310 can rotate the polarization of the incoming light, by an angle that is dependent on the thickness of the rotator 310, and the magnetic field provided by a magnet 311 that surrounds the Faraday rotator. Two birefringent crystals 315 and 316, having their individual optical axes oriented at 45 degrees with respect to each other, are located on opposite sides of the Faraday rotator 310. (Although referred to here and in the following as "birefringent crystals", more generally other birefringent elements, such as made of plastics that are under stress or other materials exhibiting birefringence, can be used.) Optical signal light with arbitrary polarization E, carried by an input fiber 301, is collimated by a lens 302. The polarization of the electrical field E of the light exiting the lens surface 302A can be decomposed into two perpendicular components, $E_o$ and $E_e$ (also shown in FIG. 3B). $E_o$ is also perpendicular to the optical axis (OA) of the birefringent crystal 315. The light is therefore split due to the difference in refraction indexes into two paths. One path carries polarization $E_o$, and is referred to as the ordinary ray, marked by o in FIGS. 3B and 3C. The other path carries polarization $E_e$, and is referred to as the extraordinary ray, marked by e.

Figure 3B:
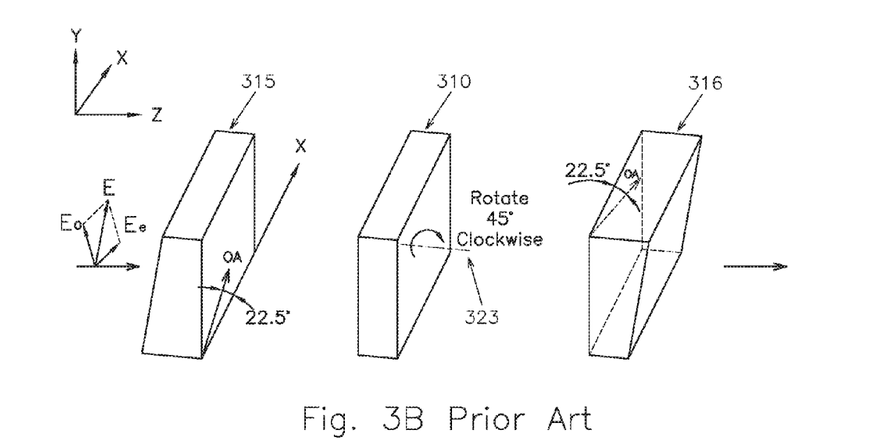
FIG. 3B provides further details on the construction and principles of operation of the isolator embodiment shown in FIG. 3A.

In FIG. 3B, the OA of the birefringent crystal 315 is chosen be in the X-Y plane, and is oriented at 22.5 degrees with respect to the X-axis (the angle can be chosen arbitrarily without affecting the birefringent crystal's operational physics). Both polarizations, as represented by the o-ray and e-ray, are rotated 45 degrees in a clockwise direction, as viewed from the light propagation direction (i.e., as shown by arrow 323 in FIG. 3B), by the Faraday rotator 310 with its applied magnetic field from the magnet 311. The OA of the birefringent crystal 316 shown in FIG. 3B is oriented 45 degree with respect to that of birefringent crystal 315, such that the o-ray in birefringent crystal 315 is maintained as the o-ray in birefringent crystal 316 and similarly for the e-ray. Indeed, birefringent crystal 316 is rotationally symmetric to birefringent crystal 315, as can be seen by rotating 315 along its X axis by 180 degrees (because a unique OA orientation of 22.5 degrees with respect to the X-axis is selected for birefringent crystal 315). Therefore, the o-ray and e-ray exit the birefringent crystal 316 as two parallel rays as indicated by 319 in FIG. 3A, with a small spatial separation s, depending on the optical thickness of the two birefringent crystals and the Faraday rotator 311. The o-ray and e-ray are thereafter focused by a second lens 320 to the output fiber 321.

Figure 3C:
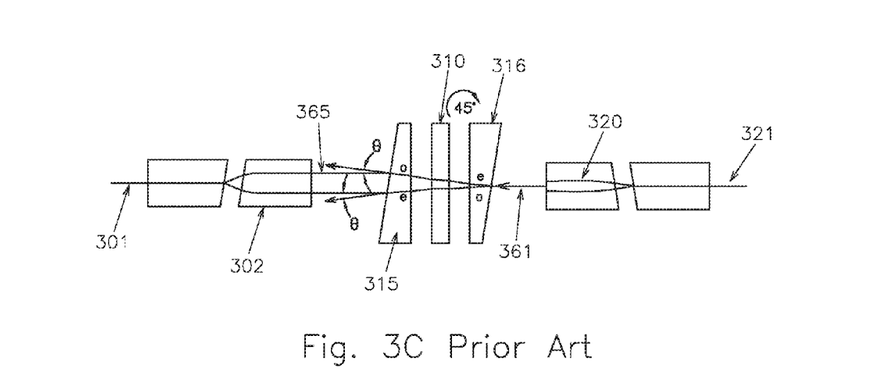
FIG. 3C shows the behavior of the isolator embodiment of FIGS. 3A and 3B, with light that passes in the reverse direction, back through the isolator.

FIG. 3C shows the optical paths of two polarized rays being transmitted in the reverse direction, from the original output fiber 321 to the original input fiber 301, of the isolator shown in FIG. 3A. A ray 361 emitted from the output fiber 321, resulting from back reflection, enters the second birefringent crystal 316 and is decomposed into two polarized rays, the o-ray and e-ray, marked by o and e, respectively. In addition to the any reflection off of the output fiber 321 or off of the lens 320, the back reflection can originate from elements off to the right side (as represented in FIG. 3c) of the birefringent crystal 316 that are not explicitly represented in the Figures. The two rays then pass through the Faraday rotator 310, and their individual polarizations are rotated by 45 degrees in the clockwise direction, similarly to what is shown in FIG. 3B. However, in the case of the reverse light path shown in FIG. 3C, the o-ray becomes the e-ray, and vice versa for the e-ray, with respect to the first birefringent crystal 315, and therefore the two rays diverge from each other. The use of a Faraday type rotator provides for the rotation to be "additive" in the two directions of optical signal travel, rather than "reciprocal" rotation, such as would be provided by quarter-wave plate, for example, which provides polarization rotation, but where the rotation is reciprocal in the two directions. The o-ray and e-ray exit the birefringent crystal 315 with an angle of θ, in positive and negative directions, respectively, with respect to an ideal collimated beam 365, which could be coupled to the input fiber 301. Thus, both the o-ray and the e-ray are barely coupled to the input fiber 301. This depicts how the back reflected light experiences high loss as it is transmitted back toward the original light source end.

Figure 4A:
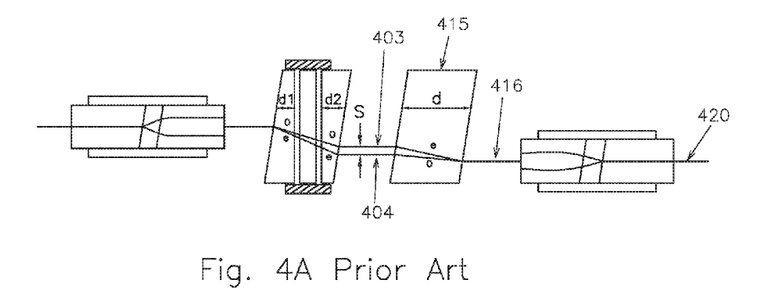
FIG. 4A shows another embodiment of an isolator component, utilizing an optical path compensator element.
Figure 4B:
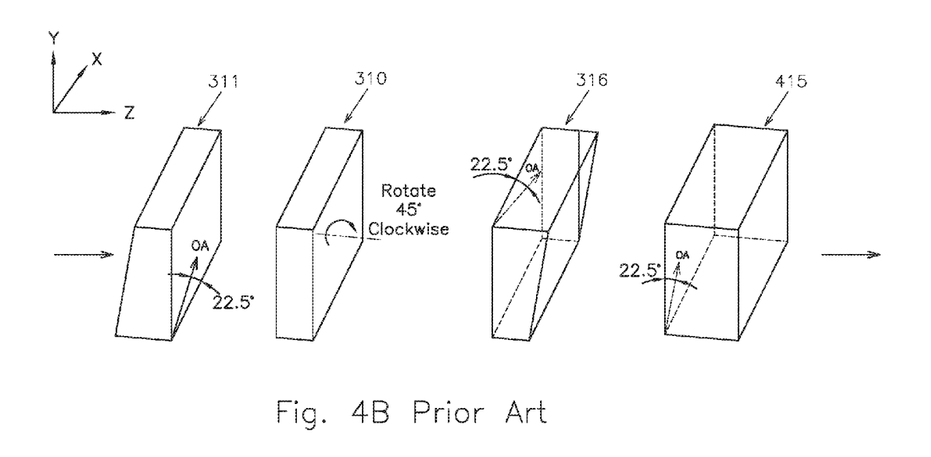
FIG. 4B provides further details on the construction and principles of operation of the isolator embodiment shown in FIG. 4A.

As stated above, in the discussion of FIG. 3A, the o-ray and e-ray exit the second birefringent crystal 316 with a small spatial separation s, which will cause polarization dependent loss when the two rays are coupled to a single output fiber 321. FIG. 4A and FIG. 4B show another embodiment of the prior art (adapted from U.S. patent application Ser. No. 08/403,405, filed Mar. 14, 1995, where they are FIGS. 1 and 2 and more detail is provided) that uses an optical path compensator 415 to unite the o-ray 403 and the e-ray 404 into a single ray, as indicated by 416, that is then coupled to the output fiber 420. For example, the optical path compensator can also made of birefringent crystal, oriented with an optical axis that is oriented at 90 degrees with respect to the OA of the second birefringent crystal of the isolator, as discussed further in U.S. patent application Ser. No. 08/403,405.

Figure 5A:
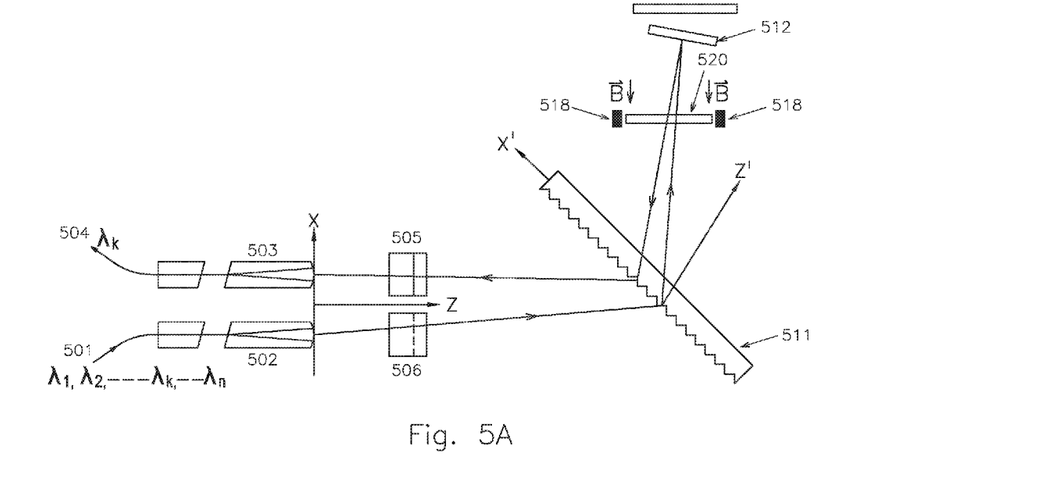
FIG. 5A shows one embodiment integrating an isolator with a tunable optical filter.
Figure 5B:
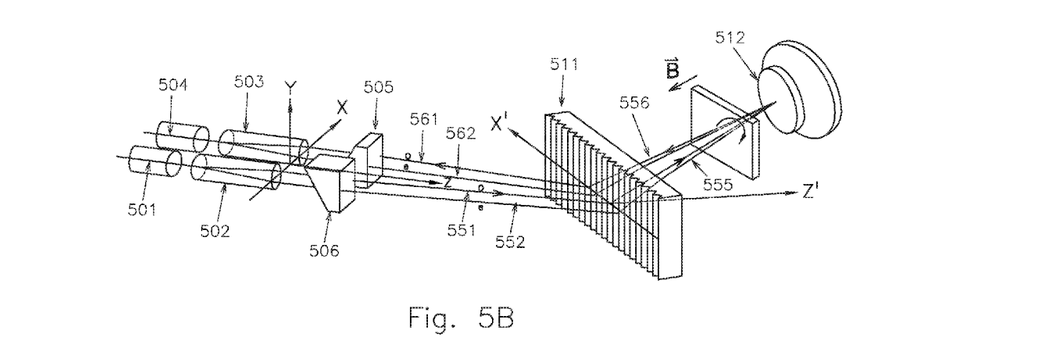
FIG. 5B shows a perspective view of the embodiment shown in FIG. 5A.

FIG. 5A illustrates an embodiment with an optical configuration that integrates an isolator with an optical tunable filter to reduce package size, material, and cost. FIG. 5B is a perspective view of FIG. 5A. A Faraday rotator 520 is interposed between a diffraction grating 511 and a rotating mirror 512, which can again be rotated by an actuator by adjusting a voltage from a voltage control circuit. The two birefringent crystals 505 and 506 are located on the same side of the Faraday rotator 520.

Figure 5C:
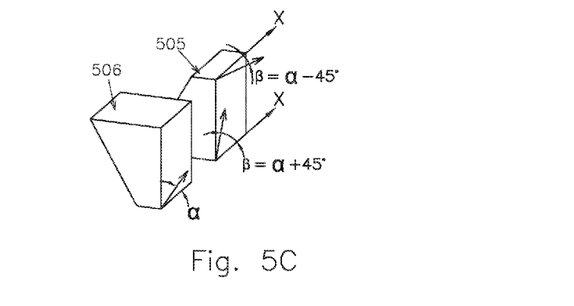
FIG. 5C shows details of the design and construction of the isolator elements used in the embodiment shown in FIGS. 5A and 5B.

An input signal carrying multiple wavelengths inside the input fiber 501 in FIGS. 5A and 5B is collimated by a first lens 502 and then enters a first birefringent crystal 506 with its OA in the X-Y plane, at an angle α, with respect to the X-axis (as shown in more detail in FIG. 5C). The light is thereafter split into o-ray 551 and e-ray 552, as shown in FIG. 5B. Each of the two rays, o-ray 551 and e-ray 552, can carry multiple wavelengths, as is the case with the input signal in the input fiber 501. The multiple wavelengths in each ray are then angularly dispersed by the diffraction grating 511 (this angular dispersion is not graphically shown in FIGS. 5A and 5B, for simplicity). Both dispersed rays, o-ray and e-ray (labeled together as item 555), then enter the Faraday rotator 520 a first time, and are rotated in the clockwise direction by 22.5 degrees. The dispersed o-ray and e-ray are then reflected by a rotating mirror 512 and re-enter the Faraday rotator a second time, such that their polarization is rotated by an additional 22.5 degrees in the clockwise direction. Thus, the dispersed o-ray and e-ray 556, after passing the Faraday rotor 520 twice, have had their polarizations rotated by a total of 45 degrees. A ring-shaped magnet 518 surrounding around the Faraday rotator 520 provides the necessary magnetic field, in order to achieve this 45 degree rotation. The return signal light 556 then passes through the diffraction grating 511 a second time (shown by o-ray 561 and e-ray 562) and is then refracted a second time by a second birefringent crystal 505, which has its OA in the X-Y plane and at an angle β with respect to the X-axis. In order to obtain maximum isolation, β is chosen to be equal to α+45 degrees. The o-ray and e-ray exit the second birefringent crystal 505 in parallel and are then coupled to an output fiber 504 via a second lens 503.

For light that is reflected from the output back towards the input port, the optical path for the back reflected light will traverse the isolation elements of the birefringent crystal 505, the Faraday rotator 520 (twice), and the birefringent crystal 506. By passing through the Faraday rotator twice on the return trip, the back reflected light is again rotated by a total of 45 degrees. Consequently, as described above with respect to FIG. 3C, both the o-ray and the e-ray are barely coupled to the input fiber 501 and the back reflected light experiences high loss as it is transmitted back towards the input port.

By taking the angle α for the first crystal 506 to be −22.5 degrees with respect to the X-axis, the angle β for the second crystal is then +22.5 degrees with respect to the X-axis. This allows for the same type of crystal element to be used for both elements 506 and 505, the first crystal being simply flipped over for the second crystal, which simplifies the production of the device. Although an angle combination where the second angle is 45 degrees greater than the first angle, and where the Faraday rotator provides a corresponding 45 degrees of rotation is optimal, a few degrees of tolerance is generally acceptable, although the deviation will reduce the amount of isolation. Consequently, the preferable angle is substantially of 45 degrees for both the difference in alignment between the birefringent elements and the amount of rotation from the Faraday rotator.

Figure 6A:
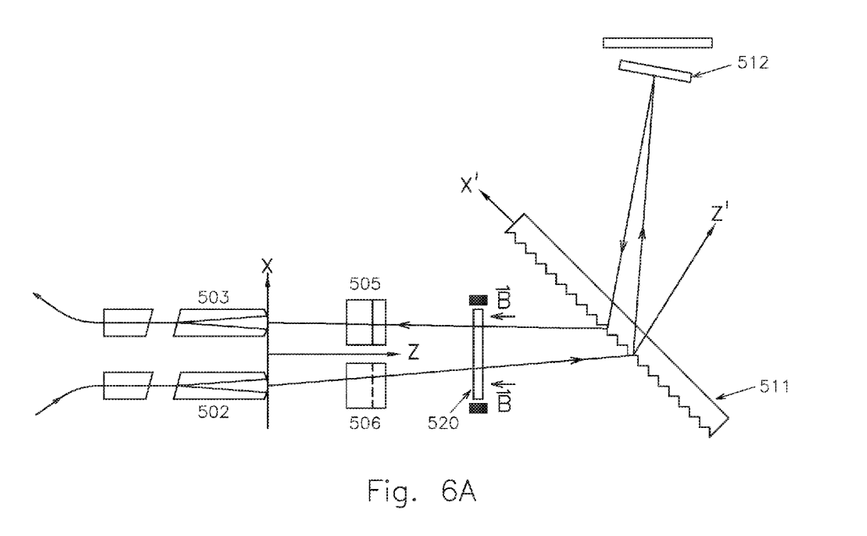
FIG. 6A shows another embodiment integrating an isolator with a tunable optical filter, in which a Faraday rotator and a pair of birefringent crystals are located adjacent to each other.

In another embodiment as shown in FIG. 6A, the Faraday rotator 520 is interposed instead between the grating 511 and the pair of birefringent crystals, 505 and 506. This configuration functions the same as the embodiment in FIGS. 5A through 5C. However, if the Faraday rotator 520 is closely adjacent to the birefringent crystal pair 505 and 506, they may be combined together to form a crystal core assembly, as indicated by item 603 in FIG. 6B. The core assembly 603 can be assembled as a separate sub-assembly, and allowing it to be dropped into the optical path between the diffraction grating 511 and the pair of focusing/collimating lenses 502 and 503.

Figure 6B:
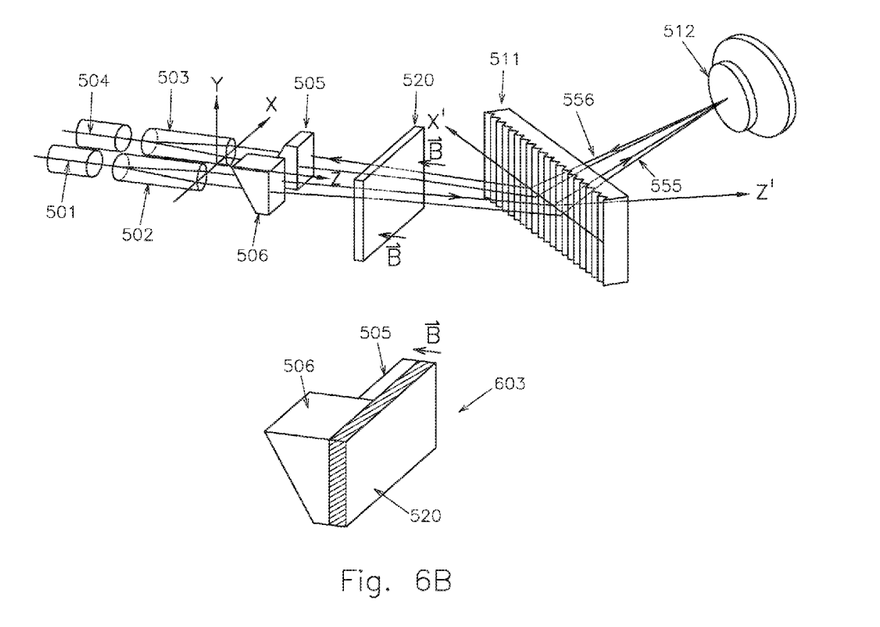
FIG. 6B shows a perspective view of the embodiment of shown in FIG. 6A, with additional details of the design and construction.

Furthermore, it is not necessary to utilize two individual lenses 502 and 503 for the collimation and focusing function. If a lens has a large enough diameter, then both input fiber 501 and output fiber 504 can share it for collimation, and still have individual optical paths that are being spatially coupled to the birefringent crystals 506 and 505, respectively.

Figure 7A:
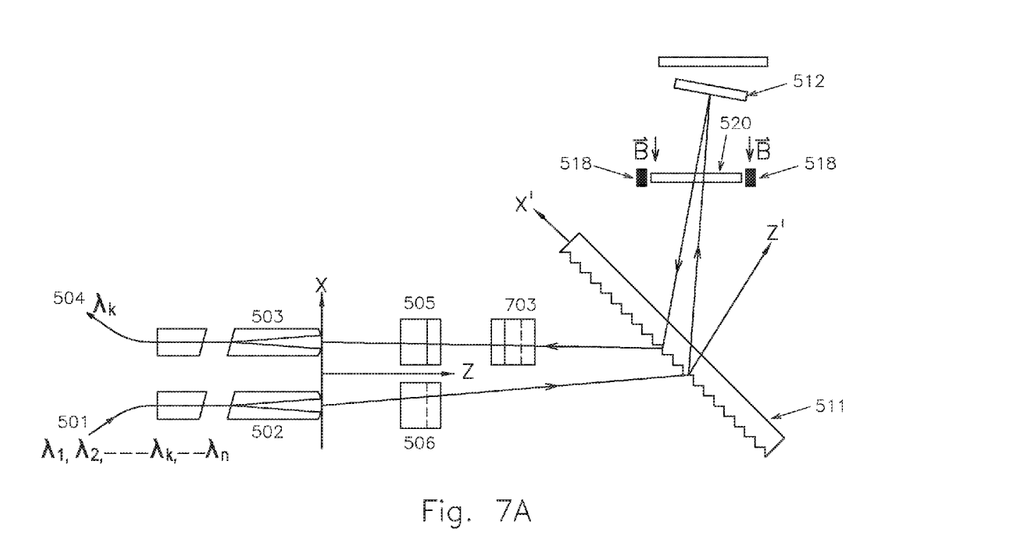
FIG. 7A shows an additional embodiment integrating an isolator with a tunable optical filter, with an optical path compensator element.
Figure 7B:
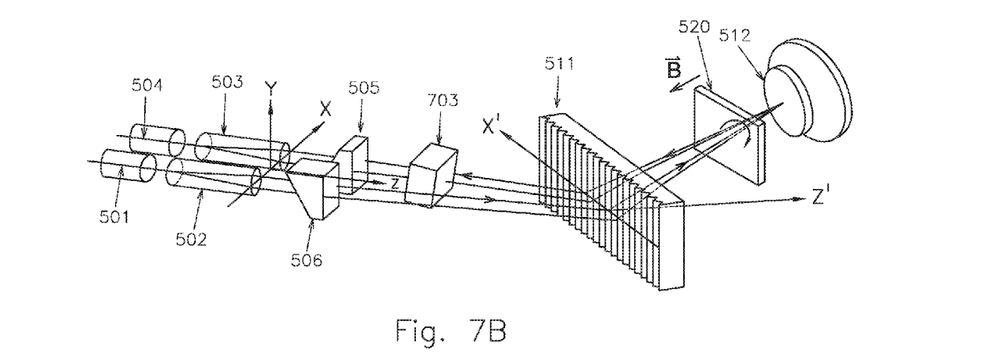
FIG. 7B shows a perspective view of the embodiment shown in FIG. 7A.

As was illustrated by the use of an optical path concentrator 415, as shown in FIGS. 4A and 4B, the embodiment that is shown in FIGS. 7A and 7B utilizes an optical path compensator 703. As before, the purpose of the optical compensator 703 is to unite the o-ray and e-ray into a single ray, before they are focused by lens 503 and coupled to the output fiber 504 to reduce polarization dependent loss. This optical path compensator can be dropped into either the forward optical path (i.e., from the input fiber 501 toward the rotating mirror 512), or in the reverse optical path (i.e., from the mirror 512 toward the output fiber 504). The location of the optical path compensator 703 is quite flexible, as it may be located somewhere between one of the birefringent crystals (either 505 or 506) and its corresponding lens, or alternatively between one of the birefringent crystals and the grating 511 (as shown in FIGS. 7A and 7B), or even between the mirror 512 and the grating 511. Additionally, the optical path compensator can be implemented as multiple compensator elements along the optical path that cumulatively provide the desired amount of compensation.

A number of other variations can also be implemented, depending on the embodiment. For example, the embodiments presented so far have all included a single grating, but other embodiments can include multiple gratings in the optical path, similar to the arrangements described in U.S. Pat. No. 7,899,330 or U.S. patent application Ser. No. 15/139,694, filed on Apr. 27, 2016. With respect to Faraday rotator, a number of additional variations are possible. In FIGS. 5-7, a single Faraday rotator is traversed twice, with each pass providing half of the desired rotation. Alternately, the Faraday rotator can be arranged so that the optical path only traverses it once, in which case the single pass would provide the full rotation. In this single rotator, single pass arrangement, the Faraday rotator 520 can be various placed on either side of the grating 511 along the optical path between the birefringent crystals 506 and 505, either before or after reflecting from the reflector 512, as long as it is traversed a single time for both the direct path from the input port to the output port and for light reflected from the output port back toward the input port. Conversely, multiple Faraday rotators can be placed in the optical path between the birefringent crystals 506 and 505, as long as the combined rotation for all of the passes through all of the rotators corresponds to the desired rotation: for example, the Faraday rotator 520 in FIGS. 6A-6C could be implemented split along the Y-axis as two separate rotators, with one before reflection and on after reflection, whose cumulative (and not necessarily equal) rotations combine to the desired amount. The embodiments in which a single Faraday rotator is traversed twice provide multiple advantages, including simplified optical alignment, as well as cost and size advantages. Since the amount of polarization rotation is only 22.5 degrees in these embodiments, the length (or thickness) of the Faraday rotator element is minimized. These embodiments take advantage of the "additive", non-reciprocal polarization rotation provided by a Faraday rotator, in which the direction of rotation is a function of the magnetic field.

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles involved and their practical application, to thereby enable others skilled in the art to best utilize the various embodiments and with various modifications as are suited to the particular use contemplated. It is intended that the scope of the invention be defined by the claims appended hereto.

It is claimed:

1. A tunable optical filter device, comprising:
   a diffraction element oriented to differentially diffract light of different wavelengths of a beam of light incident thereupon from an input port;
   a reflector configured to reflect a portion of the beam of light incident thereupon by the diffraction element to be diffracted a second time by the diffraction element in an optical path between the input port and an output port;
   a first birefringent element having a first optical axis in the optical path between the input port and the diffraction element;
   a second birefringent element having a second optical axis in the optical path between the diffraction element and the output port, wherein the second optical axis is oriented substantially at a 45 degree angle with respect to the first optical axis along the optical path;
   one or more Faraday rotators located in the optical path between the first and second birefringent elements such that the optical path passes through each of the Faraday rotators one or more times, where the one or more Faraday rotators are configured to provide a combined rotation of polarization to a beam of light traversing the optical path between the first and second birefringent elements substantially equal to the difference in orientation between the optical axes of the first and second birefringent elements; and
   an actuator connected to change a position of the reflector so that a selected range of wavelengths of the portion of the beam of light incident upon the reflector is reflected along the optical path from the input port to the output port.

2. The tunable optical filter device of claim 1, wherein the one or more Faraday rotators is a single Faraday rotator located in the optical path between the first and second birefringent elements such that the optical path passes through the Faraday rotator a single time.

3. The tunable optical filter device of claim 1, wherein the one or more Faraday rotators is a single Faraday rotator located in the optical path between the first and second birefringent elements such that the optical path passes through the Faraday rotator a first time and a second time.

4. The tunable optical filter device of claim 3, wherein the Faraday rotator is located in the optical path between the diffraction element and the reflector, such that the optical path passes through the Faraday rotator a first time and a second time after being diffracted the first time and before being diffracted the second time.

5. The tunable optical filter device of claim 3, wherein the Faraday rotator is located in the optical path between the first and second birefringent elements such that the optical path passes through the Faraday rotator the first time before being diffracted the first time and passes through the Faraday rotator the second time after being diffracted the second time.

6. The tunable optical filter device of claim 5, wherein the first and second birefringent elements and the Faraday rotator are formed into a single assembly.

7. The tunable optical filter device of claim 1, further comprising:
   an optical path compensator located in the optical path between the input port and the output port, configured to recombine polarization components of the beam of light that are spatially separated by the first and second birefringent elements, prior to entering the output port.

8. The tunable optical filter device of claim 1, wherein the actuator changes the position of the reflector by rotating the reflector about one or more axes.

9. The tunable optical filter device of claim 1, further comprising:
   a lens located in the optical path between the input port and the first birefringent element, whereby the beam of light incident on the first birefringent element from the input port is collimated.

10. The tunable optical filter device of claim 1, further comprising:
    a lens located in the optical path between the second birefringent element and the output port, whereby the beam of light incident on the output port from the second birefringent element is focused.

11. A method, comprising:
    receiving a beam of light from an input port;
    refracting the beam of light a first time by a first birefringent element having a first optical axis;
    differentially diffracting, by a diffraction element, light of different wavelengths of the beam of light from the input port that is incident thereon through the first birefringent element;
    positioning a reflector so that a first selected range of wavelengths of a portion of the beam of light incident upon the reflector from the diffraction element is reflected along an optical path from the input port to an output port;

diffracting a second time by the diffraction element of the portion of the beam of light incident upon the reflector along a portion the optical path between the reflector and the output port;

refracting the beam of light a second time along a portion the optical path between the diffraction element and the output port by a second birefringent element having a second optical axis, wherein the second optical axis is oriented substantially at a 45 degree angle with respect to the first optical axis along the optical path; and rotating one or more times a polarization of a beam of light traversing the optical path between the first and second birefringent elements, wherein the combined rotation from the one or more times is substantially equal to the difference in orientation between the optical axes of the first and second birefringent elements.

12. The method of claim 11, wherein the rotating one or more times is a single rotating having a rotation substantially equal to the difference in orientation between the optical axes of the first and second birefringent elements.

13. The method of claim 11, wherein the rotating one or more times is rotating a first rotation and a second rotation, wherein the combined rotation from the first and second rotations is substantially equal to the difference in orientation between the optical axes of the first and second birefringent elements.

14. The method of claim 13, wherein the rotating is performed by a Faraday rotator located in the optical path between the diffraction element and the reflector, such that the optical path passes through the Faraday rotator a first time and a second time after being diffracted the first time and before being diffracted the second time.

15. The method of claim 13, wherein the rotating is performed by a Faraday rotator located in the optical path between the first and second birefringent elements such that optical path passes through the Faraday rotator the first time before being diffracted the first time and passes through the Faraday rotator the second time after being diffracted the second time.

16. The method of claim 15, wherein the first and second birefringent elements and the Faraday rotator are formed into a single assembly.

17. The method of claim 11, further comprising:
recombining polarization components of the beam of light that are spatially separated by the first and second birefringent elements, prior to entering the output port.

18. The method of claim 11, wherein the first optical axis lies in a plane orthogonal to a plane that embeds the optical path, oriented at an angle of substantially 22.5 degrees relative to the plane that embeds the optical path.

19. The method of claim 11, wherein positioning the reflector includes rotating the reflector about one or more axes.

20. The method of claim 11, further comprising:
collimating the beam of light from the input port onto the first birefringent element by a lens located in the optical path between the input port and the first birefringent element.

21. The method of claim 11, further comprising:
focusing the beam of light incident on the output port from the second birefringent element by a lens located in the optical path between the second birefringent element and the output port.

* * * * *

UNITED STATES PATENT AND TRADEMARK OFFICE
CERTIFICATE OF CORRECTION

PATENT NO. : 9,791,627 B1  
APPLICATION NO. : 15/154643  
DATED : October 17, 2017  
INVENTOR(S) : Ho-Shang Lee Page 1 of 1

It is certified that error appears in the above-identified patent and that said Letters Patent is hereby corrected as shown below:

On the Title Page

Item (56), under Other Publications, Line 2: Delete "Bandwith" and replace with -- Bandwidth --.

In the Claims

Column 9, Line 3, (Claim 11, Line 16): After "portion" and before "the" insert -- of --.

Column 9, Lines 6-7, (Claim 11, Lines 19-20): After "portion" and before "the" insert -- of --.

Signed and Sealed this  
Fifteenth Day of May, 2018

Andrei Iancu  
*Director of the United States Patent and Trademark Office*